United States Patent [19]
Cole et al.

[11] Patent Number: 6,016,665
[45] Date of Patent: Jan. 25, 2000

[54] CASCADE REFRIGERATION PROCESS FOR LIQUEFACTION OF NATURAL GAS

[75] Inventors: Eric T. Cole, Kingwood; Ronald R. Bowen, Magnolia, both of Tex.

[73] Assignee: Exxon Production Research Company, Houston, Tex.

[21] Appl. No.: 09/099,590

[22] Filed: Jun. 18, 1998

Related U.S. Application Data

[60] Provisional application No. 60/050,280, Jun. 20, 1997, and provisional application No. 60/079,680, Mar. 27, 1998.

[51] Int. Cl.⁷ .................................................... F25J 1/00
[52] U.S. Cl. .............................................. 62/612; 62/613
[58] Field of Search ........................... 62/612, 613, 335, 62/606, 619, 611, 618

[56] References Cited

U.S. PATENT DOCUMENTS

| | | | |
|---|---|---|---|
| 3,298,805 | 1/1967 | Secord et al. | 48/190 |
| 3,477,509 | 11/1969 | Arendt | 166/252 |
| 3,581,511 | 6/1971 | Peck | 62/24 |
| 3,596,472 | 8/1971 | Streich | 62/28 |
| 3,763,358 | 10/1973 | Gaumer et al. | 62/612 |
| 3,763,658 | 10/1973 | Gaumer, Jr. et al. | 62/40 |
| 3,818,714 | 6/1974 | Etzbach et al. | 62/11 |
| 3,970,441 | 7/1976 | Etzbach et al. | 62/28 |
| 4,057,972 | 11/1977 | Sarsten | 62/23 |
| 4,315,407 | 2/1982 | Creed et al. | 62/53 |
| 4,430,103 | 2/1984 | Gray et al. | 62/612 |
| 4,504,296 | 3/1985 | Newton et al. | 62/31 |
| 4,548,629 | 10/1985 | Chiu | 62/17 |
| 4,680,041 | 7/1987 | DeLong | 62/612 |
| 5,199,266 | 4/1993 | Johansen | 62/8 |
| 5,291,736 | 3/1994 | Paradowski | 62/20 |
| 5,473,900 | 12/1995 | Low | 62/9 |
| 5,626,034 | 5/1997 | Manley et al. | 62/623 |
| 5,701,761 | 12/1997 | Provost et al. | 62/613 |
| 5,746,066 | 5/1998 | Manley | 62/612 |

OTHER PUBLICATIONS

Bennett, C. P. *Marine Transportation of LNG at Intermediate Temperature*, CME (Mar. 1979), pp. 63–64.

Broeker, R. J. *CNG and MLG–New Natural Gas Transportation Processes*, American Gas Journal (Jul. 1969) pp.138–140.

Domain, L. *LNG–Dreams and Prospects*, World Petroleum (Apr. 1967), pp. 300–304.

Faridany, E. K., Ffooks R. C., and Meikle, R. B. *A Pressure LNG System*, European Offshore Petroleum Conference & Exhibition (Oct. 21–24, 1980), vol. EUR 171, pp. 245–254.

Faridany, E. K., Secord, H.C, O'Brien, J. V., Pritchard, J. F., and Banister, M. *The Ocean Phoenix Pressure–LNG System*, GASTECH 76 (1976), New York, pp. 267–280.

Fluggen, Prof. E. and Backhaus, Dr. I. H. *Pressurised LNG —and the Utilisation of Small Gas Fields*, GASTECH78, LNG/LPG Conference (Nov. 7, 1978), Monte Carlo pp. 195–204.

(List continued on next page.)

*Primary Examiner*—William Doerrler
*Attorney, Agent, or Firm*—Gary D. Lawson

[57] ABSTRACT

This invention relates to a process for liquefying a pressurized gas stream rich in methane in which the liquefication of the gas stream occurs in a heat exchanger being cooled by a cascade refrigeration system to produce a methane-rich liquid product having a temperature above about −112° C. (−170° F.). In this process, a pressurized gas stream is introduced into heat exchange contact with a first refrigerant cycle comprising at least one refrigeration stage whereby the temperature of the gas stream is reduced by heat exchange with a first portion of a first refrigerant to produce a cooled gas stream. The cooled gas stream is then introduced into heat exchange contact with a second refrigerant cycle comprising at least one refrigeration stage whereby the temperature of the cooled gas stream is further reduced by heat exchange with a second refrigerant to produce a liquefied methane-rich stream having a temperature above about −112° C. (−170° F.) and a pressure sufficient for the liquefied stream to be at or below its bubble point.

23 Claims, 2 Drawing Sheets

OTHER PUBLICATIONS

Gas Processors Association. *Cryogenics, Plant Processing of Natural Gas* (1974), Chapter VI, pp.79–87.

Harper, E. A., Rust, J. E., and Dean, L. E. *Trouble Free LNG: A reliable, easy–to–operate liquefaction cycle eliminates many of the difficulties of LNG production.*, Chemical Engineering Progress (Nov. 1975), Vo. 71, No. 11, pp. 75–79.

Jackson, R. G. *Today's Processes for the Liquefaction of Natural Gas*, World Petroleum (Sep. 1966), pp. 52–56.

Kinard, G. E. and Gaumer, L. S. *Mixed Refrigerant Cascade Cycles for LNG*, Chemical Engineering Progress (Jan. 1973), vol. 69, No. 1, pp. 56–61.

Price, B.C., Zey, A. F., and Ryan, J. M. *Sour Gas Processing for Gas Sales and LNG Production*, Society of Petorleum Engineers 1996 International Meeting on Petroleum Engineering (Mar. 17–20, 1986), Beijing China, Paper No. SPE 14057, pp. 145–155.

Broeker, R. J. *A New Process for the Transportation of Natural Gas*, Proceedings of the First International Conference on LNG (1968), Chicago, Illinois, Session No. 5, Paper 30, pp. 1–11.

CASCADE REFRIGERATION PROCESS FOR LIQUEFACTION OF NATURAL GAS

This application claims the benefit of (i) U.S. Provisional Application No. 60/050280, filed Jun. 20, 1997; and (ii) U.S. Provisional Application No. 60/079,680, filed Mar. 27, 1998.

FIELD OF THE INVENTION

This invention relates to a natural gas liquefaction process, and more particularly relates to a process to produce pressurized liquid natural gas (PLNG).

BACKGROUND OF THE INVENTION

Because of its clean burning qualities and convenience, natural gas has become widely used in recent years. Many sources of natural gas are located in remote areas, great distances from any commercial markets for the gas. Sometimes a pipeline is available for transporting produced natural gas to a commercial market. When pipeline transportation is not feasible, produced natural gas is often processed into liquefied natural gas (which is called "LNG") for transport to market.

One of the distinguishing features of a LNG plant is the large capital investment required for the plant. The equipment used to liquefy natural gas is generally quite expensive. The liquefaction plant is made up of several basic systems, including gas treatment to remove impurities, liquefaction, refrigeration, power facilities, and storage and ship loading facilities. While the cost of LNG plant can vary widely depending upon plant location, a typical conventional LNG project can cost from U.S. $5 billion to U.S. $10 billion, including field development costs. The plant's refrigeration systems can account for up to 30 percent of the cost.

In the design of a LNG plant, three of the most important considerations are (1) the selection of the liquefaction cycle, (2) the materials used in the containers, piping, and other equipment, and (3) the process steps for converting a natural gas feed stream into LNG.

LNG refrigeration systems are expensive because so much refrigeration is needed to liquefy natural gas. A typical natural gas stream enters a LNG plant at pressures from about 4,830 kPa (700 psia) to about 7,600 kPa (1,100 psia) and temperatures from about 20° C. (68° F.) to about 40° C. (104° F.). Natural gas, which is predominantly methane, cannot be liquefied by simply increasing the pressure, as is the case with heavier hydrocarbons used for energy purposes. The critical temperature of methane is −82.5° C. (−116.5° F.). This means that methane can only be liquefied below that temperature regardless of the pressure applied. Since natural gas is a mixture of gases, it liquefies over a range of temperatures. The critical temperature of natural gas is between about −85° C. (−121° F.) and −62° C. (−80° F.). Typically, natural gas compositions at atmospheric pressure will liquefy in the temperature range between about −165° C. (−265° F.) and −155° C. (−247° F.). Since refrigeration equipment represents such a significant part of the LNG facility cost, considerable effort has been made to reduce refrigeration costs.

Although many refrigeration cycles have been used to liquefy natural gas, the three types most commonly used in LNG plants today are: (1) "expander cycle" which expands gas from a high pressure to a low pressure with a corresponding reduction in temperature, (2) "multi-component refrigeration cycle" which uses a multi-component refrigerant in specially designed exchangers, and (3) "cascade cycle" which uses multiple single component refrigerants in heat exchangers arranged progressively to reduce the temperature of the gas to a liquefaction temperature. Most natural gas liquefaction cycles use variations or combinations of these three basic types.

The cascade system generally uses two or more refrigeration loops in which the expanded refrigerant from one stage is used to condense the compressed refrigerant in the next stage. Each successive stage uses a lighter, more volatile refrigerant which, when expanded, provides a lower level of refrigeration and is therefore able to cool to a lower temperature. To diminish the power required by the compressors, each refrigeration cycle is typically divided into several pressure stages (three or four stages is common). The pressure stages have the effect of dividing the work of refrigeration into several temperature steps. Propane, ethane, ethylene, and methane are commonly used refrigerants. Since propane can be condensed at a relatively low pressure by air coolers or water coolers, propane is normally the first-stage refrigerant. Ethane or ethylene can be used as the second-stage refrigerant. Condensing the ethane exiting the ethane compressor requires a low-temperature coolant. Propane provides this low-temperature coolant function. Similarly, if methane is used as a final-stage coolant, ethane is used to condense methane exiting the methane compressor. The propane refrigeration system is therefore used to cool the feed gas and to condense the ethane refrigerant and ethane is used to further cool the feed gas and to condense the methane refrigerant.

Materials used in conventional LNG plants also contribute to the plants' cost. Containers, piping, and other equipment used in LNG plants are typically constructed, at least in part, from aluminum, stainless steel or high nickel content steel to provide the necessary strength and fracture toughness at low temperatures.

In conventional LNG plants water, carbon dioxide, sulfur-containing compounds, such as hydrogen sulfide and other acid gases, n-pentane and heavier hydrocarbons, including benzene, must be substantially removed from the natural gas processing, down to parts-per-million (ppm) levels. Some of these compounds will freeze, causing plugging problems in the process equipment. Other compounds, such as those containing sulfur, are typically removed to meet sales specifications. In a conventional LNG plant, gas-treating equipment is required to remove the carbon dioxide and acid gases. The gas treating equipment typically uses a chemical and/or physical solvent regenerative process and requires a significant capital investment. Also, the operating expenses are high. Dry bed dehydrators, such as molecular sieves, are required to remove the water vapor. A scrub column and fractionation equipment are typically used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapor in LNG containers at the point of delivery is undesirable.

There is a continuing need in the industry for an improved process for liquefying natural gas which minimizes the amount of refrigeration equipment and the process horsepower required.

SUMMARY

This present invention relates generally to a liquefaction process of a gas stream rich in methane and having an initial pressure above about 3,100 kPa (450 psia). The primarily refrigeration for condensing the natural gas is by cascade refrigeration cycles, preferably only two cycles. The natural gas is then pressure expanded by a suitable pressure expansion means to produce a methane-rich liquid product having a temperature above about −112° C. (−170° F.) and a pressure sufficient for the liquid product to be at or below its bubble point.

The process of this invention may also condense boil-off vapor produced by a pressurized liquid natural gas. If the natural gas contains hydrocarbons heavier than methane and it is desired to remove the heavier hydrocarbons, a fractionation process may be added to the process.

The method of the present invention can be used both for the initial liquefaction of a natural gas at the source of supply for storage or transportation, and to re-liquefy natural gas vapor given off during storage and ship loading. Accordingly, an object of this invention is to provide an improved liquefaction system for the liquefaction or reliquefaction of natural gas. Another object of this invention is to provide an improved liquefaction system wherein substantially less compression power is required than in prior art systems. A still further object of the invention is to provide an improved liquefaction process that is economical and efficient in operation. The very low temperature refrigeration of conventional LNG process is very expensive compared to the relatively mild refrigeration needed in the production of PLNG in accordance with the practice of this invention.

BRIEF DESCRIPTION OF THE DRAWINGS

The present invention and its advantages will be better understood by referring to the following detailed description and the attached Figures which are schematic flow diagrams of representative embodiments of this invention.

Figure 1:
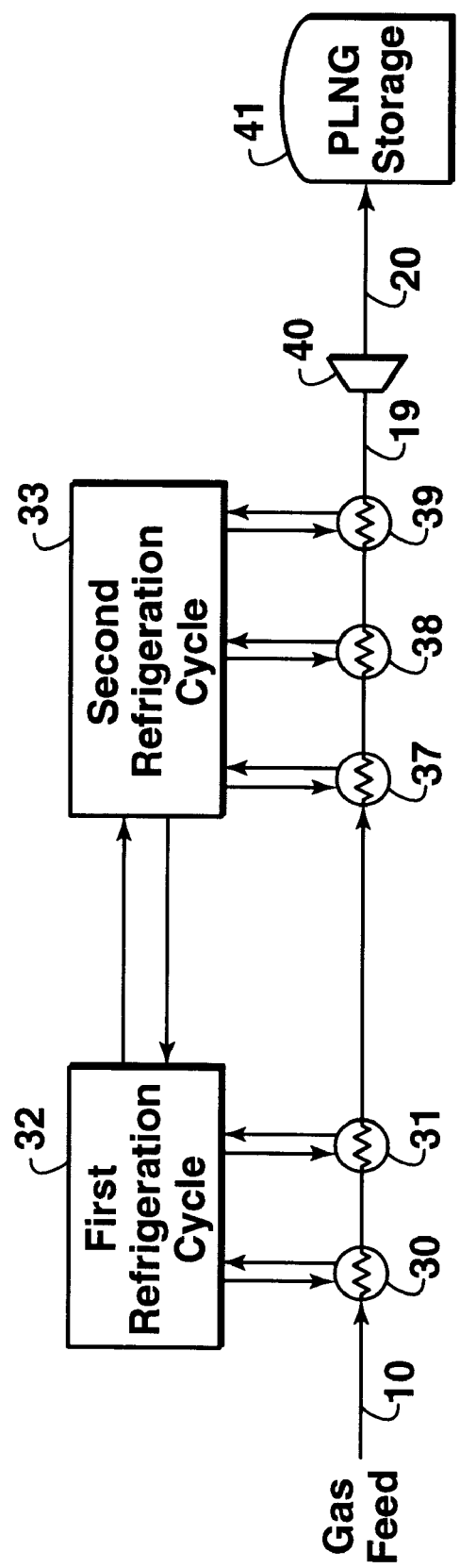
FIG. 1 is a schematic flow diagram of one embodiment of the process of this invention showing a two-cycle cascade refrigeration system to produce PLNG.

The flow diagrams illustrated in the Figures present various embodiments of practicing the process of this invention. The Figures are not intended to exclude from the scope of the invention other embodiments that are the result of normal and expected modifications of these specific embodiments. Various required subsystems such as pumps, valves, flow stream mixers, control systems, and sensors have been deleted from the Figures for the purposes of simplicity and clarity of presentation.

DESCRIPTION OF THE PREFERRED EMBODIMENTS

The present invention uses a cascade refrigeration system to liquefy natural gas to produce a methane-rich liquid product having a temperature above about −112° C. (−170° F.) and a pressure sufficient for the liquid product to be at or below its bubble point. This methane-rich product is sometimes referred to in this description as pressurized liquid natural gas (PLNG). The term "bubble point" is the temperature and pressure at which a liquid begins to convert to gas. For example, if a certain volume of PLNG is held at constant pressure, but its temperature is increased, the temperature at which bubbles of gas begin to form in the PLNG is the bubble point. Similarly, if a certain volume of PLNG is held at constant temperature but the pressure is reduced, the pressure at which gas begins to form defines the bubble point. At the bubble point the mixture is a saturated liquid.

Using a cascade refrigeration system in accordance with the present invention requires less power for liquefying the natural gas than cascade refrigeration processes used in the past and the equipment used in the process of this invention can be made of less expensive materials. By contrast, prior art processes that produce LNG at atmospheric pressures having temperatures as low as −160° C. (−256° F.) require that at least part of the process equipment be made of expensive materials for safe operation.

The energy needed for liquefying the natural gas in the practice of this invention is greatly reduced over energy requirements of a conventional LNG plant. The reduction in necessary refrigeration energy required for the process of the present invention results in a large reduction in capital costs, proportionately lower operating expenses, and increased efficiency and reliability, thus greatly enhancing the economics of producing liquefied natural gas.

At the operating pressures and temperatures of the present invention, about 3 ½ weight percent nickel steel can be used in piping and facilities in the coldest operating areas of the liquefaction process, whereas the more expensive 9 weight percent nickel or aluminum is generally required for the same equipment in a conventional LNG process. This provides another significant cost reduction for the process of this invention compared to prior art LNG processes.

The first consideration in cryogenic processing of natural gas is contamination. The raw natural gas feed stock suitable for the process of this invention may comprise natural gas obtained from a crude oil well (associated gas) or from a gas well (non-associated gas). The composition of natural gas can vary significantly. As used herein, a natural gas stream contains methane ($C_1$) as a major component. The natural gas will typically also contain ethane ($C_2$), higher hydrocarbons ($C_{3+}$), and minor amounts of contaminants such as water, carbon dioxide, hydrogen sulfide, nitrogen, butane, hydrocarbons of six or more carbon atoms, dirt, iron sulfide, wax, and crude oil. The solubilities of these contaminants vary with temperature, pressure, and composition. At cryogenic temperatures, $CO_2$, water, and other contaminants can form solids, which can plug flow passages in cryogenic heat exchangers. These potential difficulties can be avoided by removing such contaminants if conditions within their pure component, solid phase temperature-pressure phase boundaries are anticipated. In the following description of the invention, it is assumed that the natural gas stream has been suitably treated to remove sulfides and carbon dioxide and dried to remove water using conventional and well known processes to produce a "sweet, dry" natural gas stream. If the natural gas stream contains heavy hydrocarbons which could freeze out during liquefaction or if the heavy hydrocarbons are not desired in the PLNG, the heavy hydrocarbon may be removed by a fractionation process prior to producing the PLNG as described in more detail below.

One advantage of the present invention is that the warmer operating temperatures enables the natural gas to have higher concentration levels of freezable components than would be possible in a conventional LNG process. For example, in a conventional LNG plant that produces LNG at −160° C. (−256° F.) the $CO_2$ must be below about 50 ppm to avoid freezing problems. In contrast, by keeping the process temperatures above about −112° C. (−170° F.), the natural gas can contain $CO_2$ at levels as high as about 1.4 mole % $CO_2$ at temperatures of −112° C. (−170° F.) and about 4.2% at −95° C. (−139° F.) without causing freezing problems in the liquefaction process of this invention.

Additionally, moderate amounts of nitrogen in the natural gas need not be removed in the process of this invention because nitrogen will remain in the liquid phase with the liquefied hydrocarbons at the operating pressures and temperatures of the present invention. The ability to reduce, or in some cases omit, the equipment required for gas treating and nitrogen rejection when the composition of the natural gas allows, provides significant technical and economic advantages. These and other advantages of the invention will be better understood by referring to the Figures.

Referring to FIG. 1, pressurized natural gas feed stream 10 preferably enters the liquefaction process at a pressure above about 1,724 kPa (250 psia) and more preferably above about 4,830 kPa (700 psia) and preferably at temperatures below about 40° C. (104° F.); however, different pressures and temperatures can be used, if desired, and the system can be appropriately modified accordingly by persons skilled in the art taking into account the teachings of this invention. If the gas stream 10 is below about 1,724 kPa (250 psia), it can be pressurized by a suitable compression means (not shown), which may comprise one or more compressors.

The feed stream 10 passes through a series of heat exchangers, preferably two heat exchangers 30 and 31, which are refrigerated by a first refrigeration cycle 32. Refrigeration cycle 32 cools the feed stream 10 in heat exchangers 30 and 31 and cools refrigerant in a second refrigeration cycle 33 which is downstream in the liquefaction process. Refrigeration cycle 33 further cools the natural gas in a series of heat exchangers, preferably three exchangers 37, 38, and 39 as shown in FIG. 1. The design and operation of the refrigeration cycles 32 and 33 are well known to those skilled in the art and details of their operation are found in the prior art. The refrigerant in the first refrigeration cycle 32 is preferably propane and the refrigerant in the second refrigeration cycle 33 is preferably ethylene. Examples of cascade refrigeration systems are described in U.S. Pat. No. 3,596,472; *Plant Processing of Natural Gas*, issued by the Petroleum Extension Service, The University of Texas at Austin, Tex. (1974); and Harper, E. A. et. al., *Trouble Free LNG*, Chemical Engineering Progress, Vol. 71, No. 11 (1975).

Liquefied natural gas stream 19 exiting the last heat exchanger 39 in accordance with the practice of this invention has a temperature above −112° C. (−170° F.) and a pressure sufficient for the liquid product to be at or below its bubble point. If the pressure of stream 10 as it exits the last stage of the second refrigeration cycle is higher than the pressure needed to keep stream 10 in a liquid phase, stream 10 may optionally be passed through one or more expansion means, such as a hydraulic turbine 40, to produce a PLNG product at a lower pressure but still having a temperature above about −112° C. (−170° F.) and a pressure sufficient for the liquid product to be at or below its bubble point. The PLNG is then sent (stream 20) to a suitable transportation or storage means 41 such as a suitable pipeline or carrier such as a PLNG ship, tank truck, or rail car.

Figure 2:
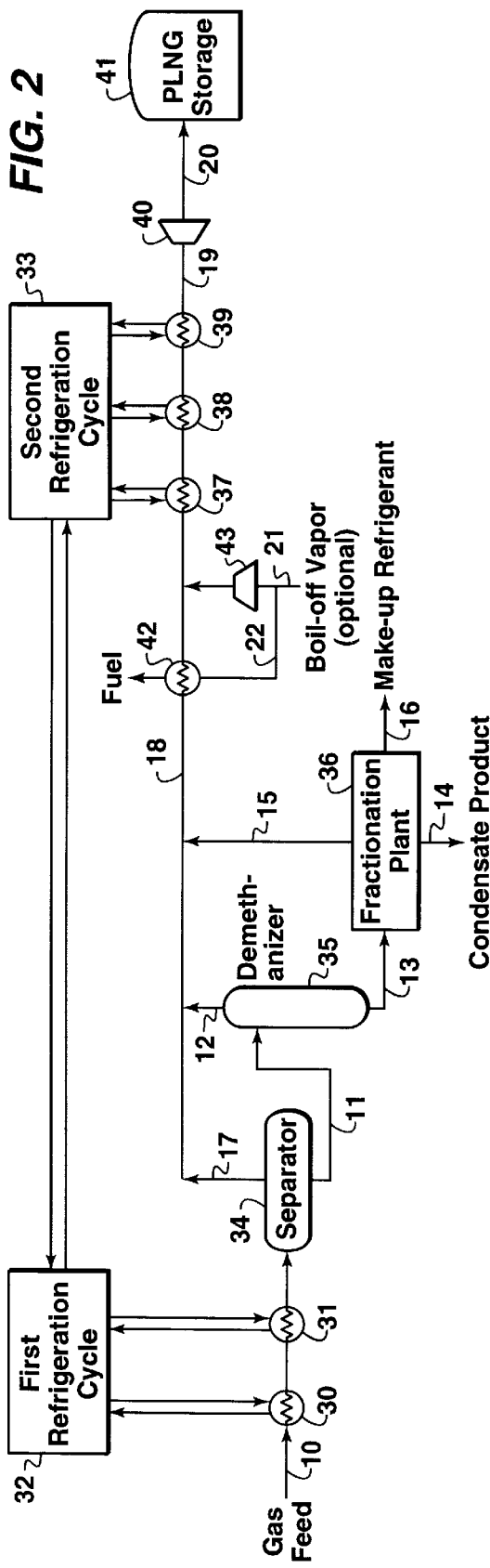
FIG. 2 is a schematic flow diagram of a second embodiment of this invention illustrating a process for condensing boil-off gas and removing heavier hydrocarbons.
Figure 3:
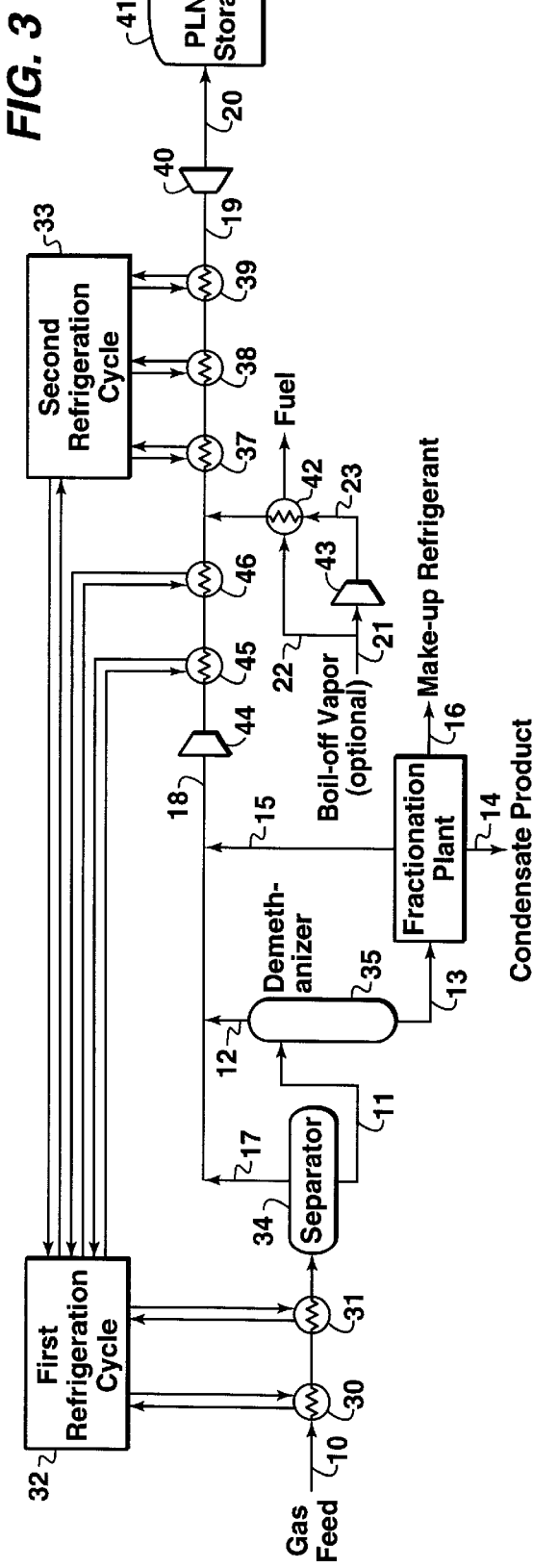
FIG. 3 is a schematic flow diagram of a third embodiment of this invention.

FIG. 2 illustrates another embodiment of the invention and in this and the embodiments illustrated in FIGS. 1 and 3, the parts having like numerals have the same process functions. Those skilled in the art will recognize, however, that the process equipment from one embodiment to another may vary in size and capacity to handle different fluid flow rates, temperatures, and compositions. Referring to FIG. 2, a natural gas feed stream enters the system through line 10 and is passed through heat exchangers 30 and 31 which are refrigerated by a first refrigeration cycle 32. Refrigeration cycle 32 cools the feed stream 10 and cools refrigerant in a second refrigeration cycle 33 which is further downstream in the liquefaction process.

After exiting the last heat exchanger 31, the feed gas stream 10 enters a conventional phase separator 34. A liquid stream 11 exits the bottom of the separator and is passed to a conventional demethanizer 35. The demethanizer produces an overhead vapor stream 12 which is rich in methane and a bottom liquid stream 13 which is predominantly natural gas liquids (NGL), primarily ethane, propane, butane, pentane, and heavier hydrocarbons. The demethanizer bottoms stream 13 is passed to a conventional fractionation plant 36, the general operation of which is known to those skilled in the art. The fractionation plant 36 may comprise one or more fractionation columns (not shown in FIG. 2) which separate liquid bottom stream 13 into predetermined amounts of ethane, propane, butane, pentane, and hexane. These liquids are withdrawn from the fractionation plant 36 as condensate products, which are collectively depicted in the FIG. 2 as stream 14. Overhead streams from the fractionation plant 36 are rich in ethane and other light hydrocarbons. These overhead streams are collectively shown in FIG. 2 as stream 15. The fractionation plant preferably comprises multiple fractionation columns (not shown) such as a deethanizer column that produces ethane, a depropanizer column that produces propane, and a debutanizer column that produces butane, which can be used as make-up refrigerants for the cascade refrigeration system (first and second refrigeration cycles 32 and 33) or any other suitable refrigeration system. The refrigerant make-up streams are collectively illustrated in FIG. 2 by line 16. Although not shown in FIG. 2, if feed stream 10 contains high concentrations of $CO_2$, one or more of the refrigerant make up streams may need to be treated to remove $CO_2$ to avoid potential plugging problems in the refrigeration equipment. If the $CO_2$ concentration in the feed stream exceeds about 3 mole percent, the fractionation plant 36 will preferably include a $CO_2$ removal process.

The methane-rich stream 17 from the separator 34, the methane-rich stream 12 from the demethanizer 35, and stream 15 from the fractionation plant 36 are combined and passed as stream 18 to a series of heat exchangers 37, 38, and 39 to liquefy the natural gas. Refrigeration to heat exchangers 37, 38, and 39 are provided by the second refrigeration cycle 33 described above. Although the refrigerants in the first and second refrigeration cycles 32 and 33 circulate in a closed-loop system, if refrigerants are lost from the system through leaks, make up refrigerants can be obtained from the fractionation plant 36 (line 16). In the liquefaction process illustrated in FIG. 2, only two cycles of a cascade system are needed to refrigerate the natural gas stream 10 in accordance with the practice of this invention.

Liquefied natural gas stream 19 exiting the last heat exchanger 39 is passed through one or more expansion means, such as hydraulic turbine 40, to produce PLNG product at a temperature above about −112° C. (−170° F.) and a pressure sufficient for the liquid product to be at or below its bubble point. The PLNG is then sent by line 20 to a suitable storage means 41.

In the storage, transportation, and handling of liquefied natural gas, there can be a considerable amount of "boil-off," the vapor resulting from evaporation of a liquefied natural gas. This invention is particularly well suited for liquefying boil-off vapor produced by PLNG. The process of this invention can optionally re-liquefy such boil-off vapor. Referring to FIG. 2, boil-off vapor may be introduced to the process of the invention through line 21. Optionally, a portion of stream 21 may be withdrawn as stream 22 and directed through a heat exchanger 42 to cool vapor stream 18 and to warm the withdrawn boil-off gas for later use as fuel for the liquefaction plant. The remaining portion of stream 21 is passed through a conventional compressor 43 to compress the boil-off vapor to approximately the pressure of vapor stream 18 and is then combined with stream 18.

FIG. 3 illustrates another embodiment of the present invention. The process illustrated in FIG. 3 is similar to the process described above with respect to FIG. 2 except that as shown in FIG. 3 stream 18 is passed through a compressor 44 and the compressed vapor stream 18 is then passed through heat exchangers 45 and 46 which are cooled by refrigerant of the first refrigeration cycle 32.

As illustrated in FIG. 3, boil-off gas may optionally be introduced to stream 18 after stream 18 has been cooled by the first refrigeration cycle 32 and before being cooled by the second refrigeration cycle 33. At least a portion of boil-off vapor stream 21 is compressed by a conventional compressor 43 and the compressed gas (stream 23) is cooled by a heat exchanger 42 which is cooled by stream 22 which has been drawn off from stream 21. Stream 22 after being heated by heat exchanger 42 may be used as fuel in the liquefaction plant.

Although FIGS. 2 and 3 show the boil-off vapor being introduced to the liquefaction process at a point after fractionation stages and before the cooling stages of the second refrigeration cycle, in the practice of this invention the boil-off vapor can be introduced to the gas stream to be liquefied at any point in the process from before exchanger 30 to after exchanger 39 and before expander 40.

This invention is not limited to any type of heat exchanger, but because of economics, plate-fin exchangers and cold box heat exchangers are preferred. Preferably all streams containing both liquid and vapor phases that are sent to heat exchangers have both the liquid and vapor phases equally distributed across the cross section area of the passages they enter. To accomplish this, it is preferred to provide distribution apparati for individual vapor and liquid streams. Separators can be added to the multi-phase flow streams as required to divide the streams into liquid and vapor streams. Such separators could be added to the processes illustrated in FIGS. 2 and 3 before heat exchangers 38 and 39.

EXAMPLE

A simulated mass and energy balance was carried out to illustrate the embodiments illustrated in the Figures, and the results are set forth in the Tables below.

The data were obtained using a commercially available process simulation program called HYSYS™, however, other commercially available process simulation programs can be used to develop the data, including for example HYSIM™, PROII™, and ASPEN PLUS™, which are all familiar to those of ordinary skill in the art. The data presented in Table 1 are offered to provide a better understanding of the embodiment shown in FIG. 2, but the invention is not to be construed as unnecessarily limited thereto. The temperatures and flow rates are not to be considered as limitations upon the invention which can have many variations in temperatures and flow rates in view of the teachings herein. In this embodiment, the first refrigeration cycle 32 is a propane system, and the second refrigeration cycle 33 is an ethylene system.

The data in Table 2 are offered to provide a better understanding of the embodiment shown in FIG. 3. In this embodiment, the first refrigeration cycle 32 is a propane system, and the second refrigeration cycle 33 is an ethane system.

Using the basic process flow scheme shown in FIG. 1 and using the same feed stream composition and temperature, the required total installed power to produce conventional LNG (at near atmospheric pressure and a temperature of −160° C. (−256° F.) was more than twice the total installed power requirement to produce PLNG using the embodiment illustrated in FIG. 1: 177,927 kW (238,600 hp) to produce LNG versus 75,839 kW (101,700 hp) to produce PLNG. This comparison was performed using the HYSYS™ process simulator.

A person skilled in the art, particularly one having the benefit of the teachings of this patent, will recognize many modifications and variations to the specific processes disclosed above. For example, a variety of temperatures and pressures may be used in accordance with the invention, depending on the overall design of the system and the composition of the feed gas. Also, the feed gas cooling train may be supplemented or reconfigured depending on the overall design requirements to achieve optimum and efficient heat exchange requirements. As discussed above, the specifically disclosed embodiments and examples should not be used to limit or restrict the scope of the invention, which is to be determined by the claims below and their equivalents.

TABLE 1

| Stream | Phase Vapor/Liquid | Pressure kPa | Pressure psia | Temperature °C. | Temperature °F. | Flow Rate kgmole/hr | Flow Rate lbmole/hr | Composition, mole % $C_1$ | $C_2$ | $C_{3+}$ | $CO_2$ | $N_2$ |
|---|---|---|---|---|---|---|---|---|---|---|---|---|
| 10 | V/L | 5,516 | 800 | 4.4 | 40 | 36,707 | 80,929 | 92.6 | 3.9 | 2.48 | 0.98 | 0.04 |
| 11 | L | 8,378 | 780 | −34.4 | −30 | 1,285 | 2,833 | 38.13 | 9.61 | 50.97 | 1.29 | 0 |
| 12 | V | 5,364 | 778 | −34.4 | −30 | 473 | 1,043 | 94.6 | 3.69 | 0.73 | 0.97 | 0.01 |
| 13 | L | 5,378 | 780 | 187.8 | 370 | 817 | 1,801 | 5.43 | 13.04 | 80.05 | 1.48 | 0 |
| 14 | L | 138 | 20 | 26.7 | 80 | 553 | 1,219 | 0 | 0 | 100 | 0 | 0 |
| 15 | V/L | 5,295 | 768 | 71.7 | 161 | 224 | 494 | 19.54 | 46.61 | 33.85 | 0 | 0 |
| 16 | L | 3,378 | 490 | 13.3 | 56 | 25 | 55 | 0 | 2.73 | 97.26 | 0.01 | 0 |
| 17 | V | 5,378 | 780 | −34.4 | −30 | 35,422 | 78,096 | 94.58 | 3.69 | 0.72 | 0.97 | 0.04 |
| 18 | V | 5,295 | 768 | −29.4 | −21 | 36,120 | 79,634 | 94.11 | 3.96 | 0.93 | 0.96 | 0.04 |
| 19 | L | 5,019 | 728 | −92.8 | −135 | 37,469 | 82,609 | 94.29 | 3.84 | 0.89 | 0.94 | 0.04 |

TABLE 1-continued

| | | | | | | | | | | | | |
|---|---|---|---|---|---|---|---|---|---|---|---|---|
| 20 | L | 2,861 | 415 | -95.6 | -140 | 37,469 | 82,609 | 94.29 | 3.84 | 0.89 | 0.94 | 0.04 |
| 21 | V | 2,827 | 410 | -90.0 | -130 | 2,724 | 6,007 | 99.11 | 0.46 | 0.01 | 0.28 | 0.14 |
| 22 | V | 2,827 | 410 | -90.0 | -130 | 1,375 | 3,031 | 99.11 | 0.46 | 0.01 | 0.28 | 0.14 |

| Power | | |
|---|---|---|
| | Power hp | Power kW |
| Compressors | | |
| 32, Stage 1 | 18,000 | 13,423 |
| 32, Stage 2 | 35,400 | 26,398 |
| 33, Stage 1 | 3,300 | 2,461 |
| 33, Stage 2 | 14,300 | 10,664 |
| 33, Stage 3 | 29,000 | 21,626 |
| 43 | 450 | 336 |
| 36 | 60 | 45 |
| Expander | | |
| 40 | -1,200 | -895 |
| Pump | | |
| 36 | 30 | 22 |
| Net Power Installed | 99,300 | 74,049 |
| Total Installed | 101,700 | 75,839 |

TABLE 2

| Stream | Phase Vapor/Liquid | Pressure kPa | Pressure psia | Temperature °C. | Temperature °F. | Flow Rate kgmole/hr | Flow Rate lbmole/hr | Composition, mole % $C_1$ | $C_2$ | $C_{3+}$ | $CO_2$ | $N_2$ |
|---|---|---|---|---|---|---|---|---|---|---|---|---|
| 10 | V/L | 5,516 | 800 | 4.4 | 40.0 | 36,707 | 80,929 | 92.6 | 3.9 | 2.48 | 0.98 | 0.04 |
| 11 | L | 5,378 | 780 | -34.4 | -30.0 | 1,285 | 2,833 | 38.13 | 9.61 | 50.97 | 1.29 | 0 |
| 12 | V | 5,364 | 778 | -34.4 | -30.0 | 498 | 1,098 | 94.61 | 3.69 | 0.72 | 0.97 | 0.01 |
| 13 | L | 5,378 | 780 | 220.0 | 428.0 | 787 | 1,735 | 2.35 | 13.36 | 82.8 | 1.49 | 0 |
| 14 | L | 138 | 20 | 26.7 | 80.0 | 553 | 1,219 | 0 | 0 | 100 | 0 | 0 |
| 15 | V/L | 5,295 | 768 | 73.9 | 165.0 | 194 | 428 | 8.57 | 47.09 | 38.91 | 5.43 | 0 |
| 16 | L | 3,378 | 490 | 13.3 | 56.0 | 40 | 88 | 4.52 | 32.87 | 62.6 | 0.01 | 0 |
| 17 | V | 5,378 | 780 | -34.4 | -30.0 | 35,422 | 78,096 | 94.58 | 3.69 | 0.72 | 0.97 | 0.04 |
| 18 | V | 5,295 | 768 | -33.3 | -28.0 | 36,115 | 79,623 | 94.11 | 3.93 | 0.93 | 0.99 | 0.04 |
| 19 | L | 9,997 | 1,450 | -87.8 | -126.0 | 37,554 | 82,796 | 94.31 | 3.79 | 0.89 | 0.97 | 0.04 |
| 20 | L | 2,861 | 415 | -95.6 | -140.0 | 37,554 | 82,796 | 94.31 | 3.79 | 0.89 | 0.97 | 0.04 |
| 21 | V | 2,827 | 410 | -90.0 | -130.0 | 2,724 | 6,007 | 99.11 | 0.46 | 0.01 | 0.28 | 0.14 |
| 22 | V | 2,827 | 410 | -90.0 | -130.0 | 1,285 | 2,833 | 99.11 | 0.46 | 0.01 | 0.28 | 0.14 |
| 23 | V | 10,273 | 1,490 | -3.3 | 26.0 | 1,439 | 3,173 | 99.11 | 0.46 | 0.01 | 0.28 | 0.14 |

| Power | | |
|---|---|---|
| | Power hp | Power kW |
| Compressors | | |
| 32, Stage 1 | 15,800 | 11,782 |
| 32, Stage 2 | 35,100 | 26,174 |
| 33. Stage 1 | 1,400 | 1,044 |
| 33, Stage 2 | 7,600 | 5,667 |
| 33, Stage 3 | 14,800 | 11,037 |
| 43 | 1,100 | 820 |
| 44 | 18,200 | 13,572 |
| 36 | 30 | 22 |
| Expander | | |
| 40 | -3,900 | -2,908 |
| Pump | | 0 |
| 36 | 30 | 22 |
| Net Power Installed | 90,200 | 67,263 |
| Total Installed | 98,000 | 73,080 |

What is claimed is:

1. A process for liquefying a pressurized methane-rich gas stream comprising the steps of:
   (a) introducing the gas stream into heat exchange contact with a first refrigerant cycle comprising at least one refrigeration stage whereby the temperature of the gas stream is reduced by heat exchange with a first portion of a first refrigerant to produce a cooled gas stream;
   (b) introducing the cooled gas stream into heat exchange contact with a second refrigerant cycle comprising at least one refrigeration stage whereby the temperature of the cooled gas stream is further reduced by heat exchange with a second refrigerant to produce a liquefied methane-rich stream having a temperature above about −112° C. (−170° F.), said second refrigerant having a boiling point lower than the boiling point of the first refrigerant and the second refrigerant being partially cooled and condensed by heat exchange with a second portion of the first refrigerant; and
   (c) introducing the liquefied stream to a storage means at a temperature above about −112° C. (−170° F.) and a pressure sufficient for the liquefied stream to be at or below its bubble point.

2. The process of claim 1 further comprises passing to said process boil-off gas resulting from evaporation of liquefied natural gas having a temperature above about −112° C. (−170° F.), the boil-off gas being at least partially liquefied by the liquefaction process.

3. The process of claim 2 further comprises separating the boil-off gas into a first stream and a second stream, compressing the first stream and passing the compressed first stream to the liquefaction process prior to at least the last cooling stage of the second refrigeration cycle, said second stream being passed to a heat exchanger to warm the second boil-off stream and to cool the natural gas stream, and using the warmed second boil-off stream as fuel.

4. The process of claim 3 comprises introducing the first stream of the boil-off gas to the gas stream before the last stage of the second refrigeration cycle.

5. The process of claim 2 further comprises separating the boil-off gas into a first stream and a second stream, compressing the first stream and passing the compressed first stream to a heat exchanger, passing the second stream through the heat exchanger to heat the second stream and to cool the compressed first stream, and introducing the cooled compressed first stream to the natural gas stream before at least the last stage of the second refrigeration cycle.

6. The process of claim 1 wherein the gas stream contains methane and hydrocarbon components heavier than methane, which further comprises removing a predominant portion of the heavier hydrocarbons to produce a vapor stream rich in methane and a liquid stream rich in the heavier hydrocarbons, the vapor stream then being liquefied by the process of claim 1.

7. The process of claim 6 wherein the liquid stream rich in the heavier hydrocarbons is further fractionated producing vapor rich in ethane which is combined with the methane-rich stream of claim 1.

8. The process of claim 1 wherein the liquefaction of the gas stream is performed using only two closed refrigeration cycles in cascade arrangement.

9. The process of claim 1 wherein the gas stream contains methane and hydrocarbon components heavier than methane, which further comprising after step (a) the additional steps of removing a predominant portion of the heavier hydrocarbons to produce a gas stream substantially free of hydrocarbons having three or more carbon atoms, compressing the vapor stream, again cooling the gas stream in at least one refrigeration stage with a third portion of the refrigerant of the first refrigerant cycle, and thereafter continuing with step (b) of claim 1.

10. The process of claim 1 wherein the pressurized methane-rich gas stream has a pressure above 3,103 kPa (450 psia).

11. A process for liquefying a natural gas stream which comprises the steps of:
   (a) cooling the natural gas stream by one or more heat exchangers by means of a first refrigeration cycle of cascade refrigeration system having two cycles;
   (b) passing the cooled natural gas to a phase separator to produce a first vapor stream and a liquid stream;
   (c) passing the liquid natural gas stream to a demethanizer to produce a second vapor stream and a second liquid stream;
   (d) passing the second liquid stream to a fractionation plant to produce condensate product, make-up refrigerant and a third vapor stream;
   (e) combining the first vapor stream, the second vapor stream, and the third vapor stream and passing the combined vapor stream to one or more heat exchangers cooled by a second refrigeration cycle of the cascade refrigeration system to at least partially liquefy the combined vapor stream; and
   (f) passing the combined vapor stream of step (e) to an expansion means to produce liquefied natural gas having a temperature above about −112° C. (−170° F.) and a pressure sufficient for the liquid product to be at or below its bubble point.

12. A process for liquefying a pressurized methane-rich gas stream comprising the steps of:
   (a) introducing the gas stream into heat exchange contact with a first refrigerant cycle comprising at least one refrigeration stage whereby the temperature of the gas stream is reduced by heat exchange with a first portion of a first refrigerant to produce a cooled gas stream;
   (b) introducing the cooled gas stream into heat exchange contact with a second refrigerant cycle comprising at least one refrigeration stage whereby the temperature of the cooled gas stream is further reduced by heat exchange with a second refrigerant, thereby condensing at least a portion of the gas stream to produce a liquefied methane-rich stream having a temperature above −112° C., said second refrigerant having a boiling point lower than the boiling point of the first refrigerant and the second refrigerant being partially cooled and condensed by heat exchange with a second portion of the first refrigerant; and
   (c) introducing the liquefied stream to a transportation means at a temperature above about −112° C. (−170° F.) and a pressure sufficient for such liquefied stream to be at or below its bubble point.

13. The process of claim 12 comprising an additional step of expanding the liquefied portion of the gas stream produced by step (b) to lower the temperature and pressure of said liquefied portion.

14. A process for liquefying a pressurized methane-rich gas stream comprising the steps of:
   (a) introducing the gas stream into heat exchange contact with a first refrigerant cycle comprising at least one refrigeration stage whereby the temperature of the gas stream is reduced by heat exchange with a first portion of a first refrigerant to produce a cooled gas stream;

(b) introducing the cooled gas stream into heat exchange contact with a second refrigerant cycle comprising at least one refrigeration stage whereby the temperature of the cooled gas stream is further reduced by heat exchange with a second refrigerant, said second refrigerant having a boiling point lower than the boiling point of the first refrigerant and the second refrigerant being partially cooled and condensed by heat exchange with a second portion of the first refrigerant;

(c) expanding the gas stream cooled by step (b) to produce a liquid stream at a temperature above about −112° C. (−170° F.) and a pressure sufficient for the liquefied stream to be at or below its bubble point; and (d) introducing the liquefied stream to a storage or transportation means at a temperature above about −112° C. (−170° F.).

15. The process of claim 14 further comprises passing to said process boil-off gas resulting from evaporation of liquefied natural gas having a temperature above about −112° C. (−170° F.), the boil-off gas being at least partially liquefied by the liquefaction process.

16. The process of claim 15 further comprises separating the boil-off gas into a first stream and a second stream, compressing the first stream and passing the compressed first stream to the liquefaction process prior to at least the last cooling stage of the second refrigeration cycle, said second stream being passed to a heat exchanger to warm the second boil-off stream and to cool the natural gas stream, and using the warmed second boil-off stream as fuel.

17. The process of claim 16 further comprising introducing the first stream of the boil-off gas to the gas stream before the last stage of the second refrigeration cycle.

18. The process of claim 16 further comprises separating the boil-off gas into a first stream and a second stream, compressing the first stream and passing the compressed first stream to a heat exchanger, passing the second stream through the heat exchanger to heat the second stream and to cool the compressed first stream, and introducing the cooled compressed first stream to the natural gas stream before at least the last stage of the second refrigeration cycle.

19. The process of claim 14 wherein the gas stream contains methane and hydrocarbon components heavier than methane, which further comprises removing a predominant portion of the heavier hydrocarbons to produce a vapor stream rich in methane and a liquid stream rich in the heavier hydrocarbons, the vapor stream then being liquefied by the process of claim 14.

20. The process of claim 19 wherein the liquid stream rich in the heavier hydrocarbons is further fractionated producing vapor rich in ethane which is combined with the methane-rich stream of claim 14.

21. The process of claim 14 wherein the liquefaction of the gas stream is performed using only two closed refrigeration cycles in cascade arrangement.

22. The process of claim 14 wherein the gas stream contains methane and hydrocarbon components heavier than methane, which further comprising after step (a) the additional steps of removing a predominant portion of the heavier hydrocarbons to produce a gas stream substantially free of hydrocarbons having three or more carbon atoms, compressing the vapor stream, again cooling the gas stream in at least one refrigeration stage with a third portion of the refrigerant of the first refrigerant cycle, and thereafter continuing with step (b) of claim 14.

23. The process of claim 14 wherein the pressurized methane-rich gas stream has a pressure above 3,103 kPa (450 psia).

* * * * *